(12) United States Patent
Wild et al.

(10) Patent No.: US 6,909,961 B2
(45) Date of Patent: Jun. 21, 2005

(54) METHOD AND DEVICE FOR MEASURING A TEMPERATURE VARIABLE IN A MASS FLOW PIPE

(75) Inventors: Ernst Wild, Oberriexingen (DE); Mario Falk, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/480,433

(22) PCT Filed: Jun. 1, 2002

(86) PCT No.: PCT/DE02/02014

§ 371 (c)(1), (2), (4) Date: Dec. 12, 2003

(87) PCT Pub. No.: WO02/103312

PCT Pub. Date: Dec. 27, 2002

(65) Prior Publication Data

US 2004/0186658 A1 Sep. 23, 2004

(30) Foreign Application Priority Data

Jun. 15, 2001 (DE) .......................... 101 29 035

(51) Int. Cl.$^7$ ................................ G01K 7/42
(52) U.S. Cl. .................. 701/114; 701/104; 701/115; 73/118.2
(58) Field of Search ................. 701/114, 115, 701/104, 102, 109; 123/480; 73/117.3, 118.2; 60/285, 295

(56) References Cited

U.S. PATENT DOCUMENTS

| | | | |
|---|---|---|---|
| 4,060,065 A | 11/1977 | Hata et al. ............ | 123/568.22 |
| 4,667,640 A * | 5/1987 | Sekozawa et al. .......... | 701/104 |
| 5,010,866 A * | 4/1991 | Ohata ......................... | 123/352 |
| 5,889,205 A * | 3/1999 | Treinies et al. ............ | 73/118.2 |
| 5,941,927 A | 8/1999 | Pfitz ........................... | 701/102 |
| 5,974,870 A * | 11/1999 | Treinies et al. ............ | 73/118.2 |
| 6,067,800 A | 5/2000 | Moraal et al. ............... | 60/602 |
| 6,588,261 B1 | 7/2003 | Wild et al. ................ | 73/118.2 |
| 6,679,238 B2 * | 1/2004 | Nebiyeloul-Kifle et al. | 123/676 |
| 2004/0159098 A1 * | 8/2004 | Gui et al. .................... | 60/295 |

FOREIGN PATENT DOCUMENTS

| | | |
|---|---|---|
| DE | 196 18 385 | 11/1997 |
| DE | 197 20 643 | 11/1998 |

OTHER PUBLICATIONS

"EGR Rate Measurement Using Temperatures", Research Disclosure, Kenneth Mason Publications, Hampshire, Great Britain, No. 352, Aug. 1, 1993, p. 488.

* cited by examiner

Primary Examiner—Hieu T. Vo
(74) Attorney, Agent, or Firm—Walter Ottesen

(57) ABSTRACT

A method and an arrangement are suggested for determining a temperature quantity in a mass flow line which includes a throttle position and to which an additional gas mass flow is supplied after the throttle position. The temperature ahead of the throttle position is determined on the basis of the portion of the additional gas mass flow in the total flow in dependence upon the temperature of the mixture of the two gas mass flows as well as the temperature of the introduced gas mass flow.

7 Claims, 2 Drawing Sheets

METHOD AND DEVICE FOR MEASURING A TEMPERATURE VARIABLE IN A MASS FLOW PIPE

FIELD OF THE INVENTION

The invention relates to a method and an arrangement for determining a temperature variable in a mass flow line.

BACKGROUND OF THE INVENTION

In some applications, for example in the context of motor vehicle technology (the engine control), it is of significance to know which temperature is present in a mass flow line provided with a throttle valve. In such an engine control, such temperature values are evaluated in the determination of actuating quantities of the engine in dependence upon an input value (see, for example, DE-A 196 18 385). A further application of the evaluation of such a temperature value is defined by the formation of actual quantities in the context of the engine control, for example, in the context of load detection (see, for example, U.S. Pat. No. 6,588,261). The temperature of the in-flowing gas ahead of the throttle position is of interest especially for considering the instantaneous density of the gas.

The determination of this temperature can take place via a corresponding temperature sensor which, however, is not recommended because of complexity and cost. Furthermore, an estimate of this temperature can be made on the basis of the temperature downstream of the throttle flap in the mass flow line by setting the temperatures forward and rearward of the throttle position equal. The temperature downstream of the throttle position is measured. This approximate determination of the temperature ahead of the throttle position is then no longer accurate enough when a mass flow is supplied between the throttle position and the temperature measurement downstream of the throttle position with this mass flow having a temperature which is significantly different from the temperature forward of the throttle position. Then, a mixture temperature of these two temperature quantities is measured downstream of the throttle position. In internal combustion engines, exhaust gas is introduced into the intake manifold between the throttle flap and the intake manifold temperature sensor (exhaust-gas recirculation). This exhaust gas has a relatively high temperature so that the mixture temperature, which is measured in the intake manifold, differs significantly from the temperature ahead of the throttle flap. The error, which is caused by setting the two temperatures equal in this case, is not satisfactory in view of the accuracy of the engine control.

The same applies when the temperature ahead of the throttle position is to be measured and the temperature downstream of the throttle position is to be estimated or when an estimate of the temperature of the additionally introduced gas is to be determined without measurement.

SUMMARY OF THE INVENTION

By modeling the temperature ahead of the throttle flap in the mass flow line in dependence upon the temperature after the throttle position, the temperature of the additionally supplied gas flow and the portion thereof in the total mass flow, a precise determination of the temperature ahead of the throttle flap is made available without an additional temperature sensor having to be used.

The same applies to the modeling of the temperature after the throttle position in the mass flow line in dependence upon the temperature ahead of the throttle position, the temperature of the additionally supplied gas flow and its rate or, in the modeling of the temperature of the additionally supplied gas flow in dependence upon the temperature downstream of the throttle position in the mass flow line, the temperature ahead of the throttle flap and the portion of the supplied gas in the mass flow line in the total flow.

In this way, complexity and cost are saved to a considerable extent.

The modeling of the temperature ahead of the throttle flap or after the throttle flap satisfies the accuracy preconditions in combination with the control of an internal combustion engine.

It is especially advantageous that the modeled signal is attenuated by means of a filter, preferably, a lowpass filter, in order to avoid a signal which is too noisy. Here, in an advantageous manner, the time constant of the filter is adapted to the portion of the introduced gas flow in the total flow. The time constant is that much greater the higher this rate is. In this way, the influence of inaccuracies and fluctuations of this portion is significantly reduced.

In an advantageous manner, the described procedure is not only applicable in connection with the control of an internal combustion engine but anywhere where a temperature variable is of significance in a mass flow line wherein additional gas flows of another temperature are introduced into the line after the throttle position.

Additional advantages should become apparent from the following description of the embodiments or from the dependent patent claims.

BRIEF DESCRIPTION OF THE DRAWINGS

The invention is described hereinafter in greater detail with respect to the embodiments shown in the drawing.

DESCRIPTION OF THE PREFERRED EMBODIMENTS OF THE INVENTION

Figure 1:
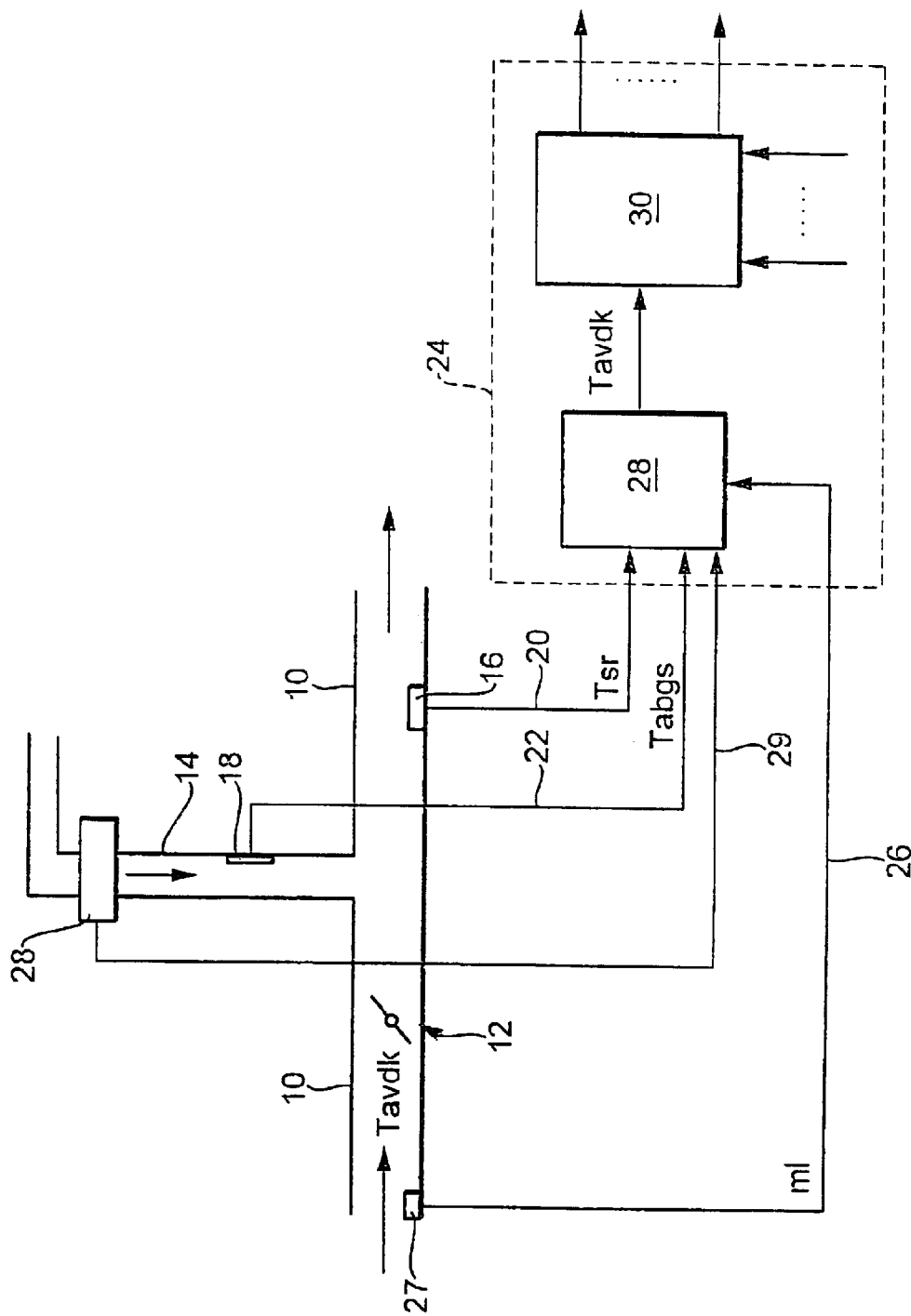
FIG. 1 shows a block circuit diagram of a mass flow line having a throttle position and an introduction of an additional gas flow as well as a sequence diagram of the assigned evaluation electronics; whereas, in FIG. 2, a sequence diagram is shown which shows a specific preferred procedure of the modeling of the temperature ahead of the throttle position in the context of a computer program.

In FIG. 1, 10 identifies a mass flow line having a throttle position 12 and a further mass flow line 14 which opens into the mass flow line 10 after the throttle position in order to introduce an additional gas flow. In the preferred embodiment of an internal combustion engine, the mass flow line 10 defines the intake manifold and the throttle position 12 defines the throttle flap and the additional mass flow line 14 is the exhaust-gas recirculation line. Corresponding to the arrows shown in FIG. 1, a gas flow flows into the mass flow line 10 from left to right and in the mass flow line 14 from top to bottom. Furthermore, a first temperature sensor 16 is provided which supplies the temperature of the flowing gas in the mass flow line 10 downstream of the introduction of the additional mass flow. In one embodiment, a further temperature sensor 18 measures the temperature of the in-flowing gas flow in the mass flow line 14. The corresponding temperature signals Tsr and Tabgs are outputted to an electronic control unit 24 via lines 20 and 22. The temperature of the in-flowing gas flow into the mass flow line 14 is computed in another embodiment, for example, on the basis of the temperature of the exhaust gas of the internal combustion engine.

Furthermore, a signal ml is supplied to the control unit 24 via an input line 26 which signal defines an index for the gas flow of the gas flow into the mass flow line 10. This signal is determined by a mass flow sensor 27. Furthermore, in one embodiment, a quantity is supplied to the control unit 24 via an input line 29. This quantity represents the position of a valve 21 in the mass flow line 14. At least one microcomputer is provided in the electronic control unit 24. The microcomputer outputs programs for evaluating the supplied signals and, if required, for forming control quantities for controlling equipment associated with the mass flow lines. In the preferred embodiment, the electronic control unit 24 defines an electronic engine control which, in dependence upon a plurality of input quantities, determines actuating quantities for adjusting ignition, air supply, fuel supply, et cetera of an internal combustion engine.

The programs, which run in the microcomputer not shown in FIG. 1, are symbolized in FIG. 1 by the blocks 28 and 30 with a view to the procedure for modeling the temperature Tavdk ahead of the throttle flap 12 described hereinafter. The above-mentioned temperature quantities and flow quantities are supplied to the model 28. First, the portion of the mass flow in the line 14 in the total flow after the entry of the line 14 into the line 10 is formed as a ratio of the mass flow msagr in line 14 to the total flow (msagr+ml). Depending upon the embodiment, the individual mass flows are measured by mass flow sensors (as shown above with respect to mass flow ml) or the individual mass flows are computed by means of models. In the application of an internal combustion engine having exhaust-gas recirculation, for example, the air mass flow, which flows via the throttle flap 12 in the line 10, is measured (air mass sensor 27) or is determined from the throttle flap position, the temperature in flow direction ahead of the throttle flap, the pressure ahead of the throttle flap and the pressure ratio at the throttle flap. The mass flow in the line 14 is, for example, computed from the position of the exhaust-gas recirculation valve 28, the temperature in flow direction ahead of the valve, the pressure ahead of the valve and the pressure ratio at the valve. In one embodiment, the temperature ahead of the valve is determined from the exhaust-gas temperature and the mass flow in the line 14.

According to the model described hereinafter in detail, the temperature ahead of the throttle position 12 Tavdk is estimated from the above-mentioned quantities. This temperature is processed in the control programs 30 together with other operating variables to actuating variables which are outputted by the control unit 24 to corresponding actuating elements. In the preferred embodiment of the control of an internal combustion engine, such procedures are, for example, known from the state of the art mentioned initially herein.

In the embodiment shown in FIG. 1, the temperature ahead of the throttle flap 12 is formed on the basis of the temperature of the additional gas mass flow and the temperature after introduction of this additional gas mass flow as well as the portion of the additional mass flow in the total flow. To determine the temperature, two temperature quantities and a quantity, which represents the portion of the additional mass flow in the total flow (hereinafter referred to as the rate) are necessary. In this way, a temperature quantity is determined on the basis of two other temperature quantities in accordance with a model, which is built up in accordance with the model described hereinafter (temperature ahead of the throttle position=f(temperature of the additional mass flow, mixture temperature) or temperature of the additional mass flow=f(temperature ahead of throttle position, mixture temperature) or, mixture temperature=f(temperature ahead of throttle position, temperature of the additional mass flow)).

The preferred application takes place, however, in the context of the configuration shown in FIG. 1 in combination with the control of an internal combustion engine. Because of the modeling of the temperature ahead of the throttle flap, the accuracy of the adjustment of the throttle flap and the computation of the air flow over the throttle flap position in accordance with the state of the art mentioned initially herein are improved. In this way, there is a contribution to maintaining exhaust-gas regulations without measuring the air flow in the intake manifold line 10.

Figure 2:
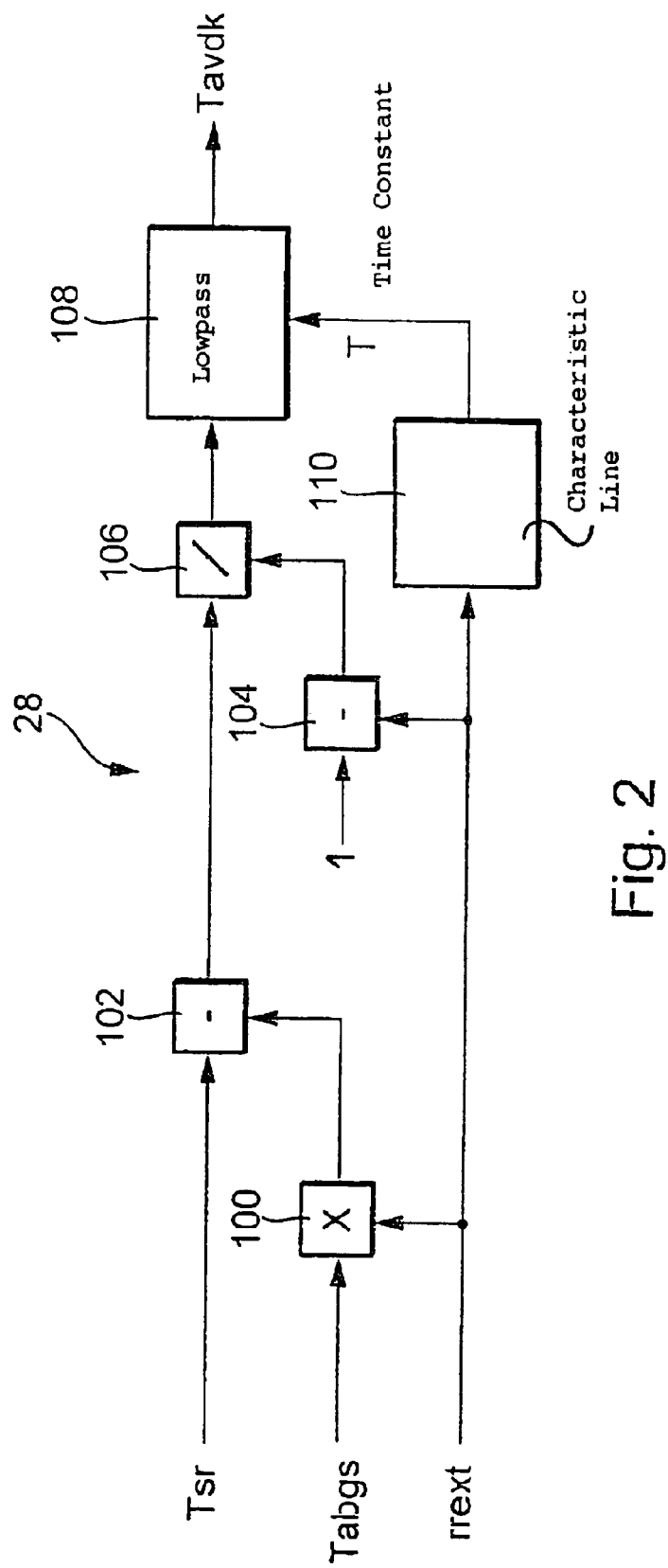

FIG. 2 shows a specific procedure for modeling the desired temperature.

FIG. 2 describes a program of a microcomputer of the control unit 24. The individual blocks define program components, programs or program steps; whereas, the connecting lines indicate the data flow. The sequence diagram of FIG. 2 defines a preferred embodiment of the model 28.

With the knowledge of the portion of the additional mass flow of the total flow (exhaust-gas recirculation rate rrext), the temperature of this gas (Tabgs) at the input position to the intake manifold as well as the mixture temperature, which is measured in the mass flow line (intake manifold air temperature Tasr), the temperature ahead of the throttle position Tavdk is determined in accordance with the following formula:

$$Tavdk=(Tsr-rrext*Tabgs)/(1-rrext)$$

The maximum value of rate rrext is 1 in this embodiment. If another value is pregiven as maximum value, the equation must be correspondingly adapted.

The direct realization of the formula supplies an irregular signal which is not especially suitable for the evaluation in the context of control operations. Accordingly, a filter, preferably a lowpass filter, is utilized in order to dampen the determined model output quantity. The time constant of the filter is selected that much greater the higher the portion of the additional mass flow is in the total flow. The influence of the inaccuracies and fluctuations in this portion are thereby weakened.

The sequence diagram of the model, which is shown in FIG. 2, reads in the exhaust-gas temperature Tabgs and the exhaust-gas recirculation rate rrext. In a multiplier position 100, the two quantities are coupled multiplicatively. The product of the two quantities is supplied to a subtraction position 102 wherein the product is subtracted from the intake manifold temperature Tsr. Furthermore, the exhaust-gas recirculation rate is subtracted from the value 1 in the subtraction position 104. This difference as well as the difference, which was formed in the subtraction position 102, is supplied to a division position 106. The difference from 102 is divided by the difference from 104. The result, that is, the raw signal of the temperature ahead of the throttle position is supplied to a lowpass filter 108. The time constant T of this filter is derived from a characteristic line 110 whose input quantity is the exhaust-gas recirculation rate rrext. The characteristic line is configured in such a manner that, the greater the exhaust-gas recirculation rate, the greater is the time constant, that is, the more pronounced the filter action. The raw signal, which is smoothed by the lowpass, defines then the evaluatable signal for the temperature ahead of the throttle position Tavdk which is evaluated, for example, in the context of the procedures mentioned initially herein.

The basis of this model is the interrelationship that, after introduction of the additional gas mass flow, the mixture temperature is put together from the portion of this gas mass flow in the total flow multiplied by its temperature as well as the portion, which is subtracted from its maximum value, multiplied by the temperature ahead of the throttle position:

$$Tsr=rrext*Tabgs+(1-rrext)*Tavdk$$

In the measurement of the air flow ml in the mass flow line 10, this relationship is defined as follows:

$$Tsr=(1-msagr/(msagr+ml))*Tabgs+(msagr/(msagr+ml))*Tavdk$$

wherein: msagr is the mass flow in the line 14.

On the basis of one of these interrelationships, and with knowledge of the temperature ahead of the throttle position and the temperature of the additional gas flow, the mixture temperature Tsr is modeled or, with knowledge of the temperature ahead of the throttle position and the mixture temperature, the temperature of the additional gas flow is determined.

Furthermore, the knowledge of the mass flows, which form the total flow, or the portion of one of the component flows in the total flow is necessary (as above, the portion rrext in the additional mass flow, in another embodiment, with the reformulation of the interrelationship, the portion rrml of the mass flow in the line 10 in the total flow).

What is claimed is:

1. An arrangement for determining a temperature quantity in a mass flow line, the arrangement comprising:

a first mass flow line for conducting a first gas mass flow and said first mass flow line including a throttle position disposed therein;

a second mass flow line opening into said first mass flow line downstream of said throttle position for introducing a second gas flow into said first mass flow line to form a total gas mass flow; and, a control unit including means for determining a first quantity for the portion of said second gas mass flow of said total flow or for determining a second quantity for the portion of said first gas mass flow in said first mass flow line of said total flow;

said control unit further including means for determining a third quantity from at least two of the following temperatures: the temperature of the second gas flow; the temperature upstream of said throttle position; and, the temperature after introducing said second gas flow;

said control unit including a model for computing a third one of said temperatures on the basis of the portion quantity and at least a first one and a second one of said temperatures;

a filter of variable time constant which smooths said third one of said temperatures; and, said time constant being adapted in dependence upon the portion of said second gas flow of said total flow with said time constant being greater the greater said portion of said second gas flow is.

2. The arrangement of claim 1, wherein said control unit is an engine control unit for an internal combustion engine and the temperature quantity is evaluated for forming the control quantities for the engine.

3. A computer program comprising program code means for carrying out a method for determining a temperature quantity in a mass flow line when the program is executed on a computer, the mass flow line being of an arrangement including a first mass flow line for conducting a first gas mass flow and said first mass flow line including a throttle position disposed therein and a second mass flow line opening into said first mass flow line downstream of said throttle position for introducing a second gas flow into said first mass flow line to form a total gas mass flow; the method comprising the steps of:

determining a first quantity for the portion of said second gas flow of the total flow or determining a second quantity for the portion of said first gas mass flow in said first mass flow line of said total flow;

determining a third quantity from at least two of the following temperatures: the temperature of the second gas flow; the temperature upstream of said throttle position; and, the temperature after introducing said second gas flow;

computing a third one of said temperatures on the basis of the portion quantity and of at least a first one and a second one of said temperatures;

smoothing the determined third temperature utilizing a filter having a variable time constant; and, adapting said time constant in dependence upon the portion of said second gas flow of said total gas flow with said time constant being greater the greater said portion of said second gas flow is.

4. A computer program product having program code means which are stored on a computer readable data carrier in order to carry out a method for determining a temperature quantity in a mass flow line when the program product is executed on a computer, the mass flow line being of an arrangement including a first mass flow line for conducting a first gas mass flow and said first mass flow line including a throttle position disposed therein and a second mass flow line opening into said first mass flow line downstream of said throttle position for introducing a second gas flow into said first mass flow line to form a total gas mass flow; the method comprising the steps of:

determining a first quantity for the portion of said second gas flow of the total flow or determining a second quantity for the portion of said first gas mass flow in said first mass flow line of said total flow;

determining a third quantity from at least two of the following temperatures: the temperature of the second gas flow; the temperature upstream of said throttle position; and, the temperature after introducing said second gas flow;

computing a third one of said temperatures on the basis of the portion quantity and of at least a first one and a second one of said temperatures;

smoothing the determined third temperature utilizing a filter having a variable time constant; and, adapting said time constant in dependence upon the portion of said second gas flow of said total gas flow with said time constant being greater the greater said portion of said second gas flow is.

5. A method for determining a temperature quantity in a mass flow line of an arrangement including a first mass flow line for conducting a first gas mass flow and said first mass flow line including a throttle position disposed therein and a second mass flow line opening into said first mass flow line downstream of said throttle position for introducing a second gas flow into said first mass flow line to form a total gas mass flow; the method comprising the steps of:

determining a first quantity for the portion of said second gas flow of the total flow or determining a second quantity for the portion of said first gas mass flow in said first mass flow line of said total flow;

determining a third quantity from at least two of the following temperatures: the temperature of the second gas flow; the temperature upstream of said throttle position; and, the temperature after introducing said second gas flow;

computing a third one of said temperatures on the basis of the portion quantity and of at least a first one and a second one of said temperatures;

smoothing the determined third temperature utilizing a filter having a variable time constant; and, adapting said time constant in dependence upon the portion of said second gas flow of said total gas flow with said time constant being greater the greater said portion of said second gas flow is.

6. The method of claim 5, wherein said time constant is read out from a characteristic line.

7. The method of claim 5, wherein said mass flow line is the intake manifold line of an internal combustion engine, the throttle position is its throttle flap and the introduced second gas flow is the recirculated exhaust gas.

* * * * *